United States Patent
Henderson

(10) Patent No.: US 11,274,412 B2
(45) Date of Patent: Mar. 15, 2022

(54) REINFORCEMENT STRUCTURES FOR TENSIONLESS CONCRETE PIER FOUNDATIONS AND METHODS OF CONSTRUCTING THE SAME

(71) Applicant: Terracon Consultants, Inc., Olathe, KS (US)

(72) Inventor: Allan P. Henderson, Bakersfield, CA (US)

(73) Assignee: TERRACON CONSULTANTS, INC., Olathe, KS (US)

( * ) Notice: Subject to any disclaimer, the term of this patent is extended or adjusted under 35 U.S.C. 154(b) by 0 days.

(21) Appl. No.: 16/518,117

(22) Filed: Jul. 22, 2019

(65) Prior Publication Data

US 2020/0248425 A1     Aug. 6, 2020

Related U.S. Application Data

(60) Provisional application No. 62/799,359, filed on Jan. 31, 2019.

(51) Int. Cl.
     *E02D 27/42*      (2006.01)
     *E02D 27/12*      (2006.01)
     (Continued)

(52) U.S. Cl.
     CPC .............. *E02D 27/425* (2013.01); *E02D 3/12* (2013.01); *E02D 27/10* (2013.01); *E02D 27/42* (2013.01);
     (Continued)

(58) Field of Classification Search
     CPC ........... E02D 5/38; E02D 5/64; E02D 27/425; E02D 2200/12
     See application file for complete search history.

(56) References Cited

U.S. PATENT DOCUMENTS

| 732,485 A | 6/1903 | Wight |
| 969,039 A | 8/1910 | Cowles |

(Continued)

FOREIGN PATENT DOCUMENTS

| CA | 2551712 | 6/2012 |
| DE | 2754577 | 6/1979 |

(Continued)

OTHER PUBLICATIONS

Declaration of Dr. John T. Bryant in Support of Petition for Inter Partes 7,618,217 (filed Sep. 9, 2021).

(Continued)

*Primary Examiner* — Benjamin F Fiorello
*Assistant Examiner* — Stacy N Lawson
(74) *Attorney, Agent, or Firm* — Jacobson Holman PLLC

(57) ABSTRACT

A reinforced tensionless concrete pier foundation for supporting a tower and a method of constructing the same is provided, the foundation having an outer CMP and an inner CMP with an annular space therebetween in which a plurality of sleeved tower anchor bolts are embedded, and the pier foundation including at least one reinforcement structure that at least partly encircles the outer CMP to provide one or more of increased lateral stiffness, increased shear resistance and overturning (upset) moment capacity, reduced bending, displacement, and deflection of the top of the pier, and improved conditioning, containment, skin friction and lateral bearing capacity of the surrounding soil and/or rock substrate that supports the tensionless pier.

13 Claims, 7 Drawing Sheets

(51) Int. Cl.
   *E02D 5/34* (2006.01)
   *E02D 27/10* (2006.01)
   *E02D 3/12* (2006.01)

(52) U.S. Cl.
   CPC .. *E02D 2200/12* (2013.01); *E02D 2250/0023* (2013.01); *E02D 2300/002* (2013.01); *E02D 2300/0026* (2013.01)

(56) References Cited

U.S. PATENT DOCUMENTS

| | | | |
|---|---|---|---|
| 1,139,384 A | 5/1915 | Taf | |
| 1,189,459 A | 7/1916 | Lundin | |
| 1,529,895 A | 3/1925 | Chance et al. | |
| 1,647,925 A | 11/1927 | May | |
| 2,377,055 A | 5/1945 | Thornley | |
| 2,625,815 A | 1/1953 | Black | |
| 2,971,295 A | 2/1961 | Reynolds | |
| 3,646,748 A | 3/1972 | Lang | |
| RE27,732 E | 8/1973 | Van Buren | |
| 3,798,868 A | 3/1974 | Loranger | |
| 3,927,497 A | 12/1975 | Yoshinaga et al. | |
| 4,043,133 A | 8/1977 | Yegge | |
| 4,051,661 A | 10/1977 | Leprohon, Jr. et al. | |
| 4,068,445 A | 1/1978 | Bobbitt | |
| 4,092,811 A | 6/1978 | Lin et al. | |
| 4,197,695 A | 4/1980 | Hughes et al. | |
| 4,247,225 A | 1/1981 | Chickini, Jr. et al. | |
| 4,866,903 A | 9/1989 | Ferstay | |
| 4,887,691 A | 12/1989 | Rotondo | |
| 5,218,805 A | 6/1993 | Rex | |
| 5,505,033 A | 4/1996 | Matsuo et al. | |
| 5,586,417 A | 12/1996 | Henderson et al. | |
| 5,623,792 A | 4/1997 | Crumpacker | |
| 5,826,387 A * | 10/1998 | Henderson | E02D 27/42 52/295 |
| 5,966,882 A | 10/1999 | Naito | |
| 6,102,118 A | 8/2000 | Moore | |
| 6,659,691 B1 | 12/2003 | Berry | |
| 6,665,990 B1 | 12/2003 | Cody et al. | |
| 6,672,023 B2 * | 1/2004 | Henderson | E02D 27/42 405/244 |
| 6,705,058 B1 | 3/2004 | Foust et al. | |
| 6,782,667 B2 | 8/2004 | Henderson | |
| 7,155,875 B2 * | 1/2007 | Henderson | E02D 27/42 52/223.4 |
| 7,533,505 B2 | 5/2009 | Henderson | |
| 7,618,217 B2 | 11/2009 | Henderson | |
| 7,707,797 B2 | 5/2010 | Henderson | |
| 7,905,069 B1 | 3/2011 | Lockwood | |
| 8,720,139 B2 | 5/2014 | Henderson | |
| 9,096,986 B2 | 8/2015 | Henderson | |
| 9,340,947 B2 | 5/2016 | Henderson | |
| 9,481,973 B2 | 11/2016 | Henderson | |
| 9,783,950 B2 | 10/2017 | Henderson | |
| 10,640,995 B2 | 5/2020 | Phuly | |
| 2002/0050110 A1 | 5/2002 | Ytterberg | |
| 2002/0095878 A1 | 7/2002 | Henderson | |
| 2002/0124502 A1 | 9/2002 | Henderson | |
| 2004/0261340 A1 | 12/2004 | Behlinger et al. | |
| 2005/0005562 A1 | 1/2005 | Henderson et al. | |
| 2011/0173897 A1 | 7/2011 | Schneider | |
| 2012/0047830 A1 | 3/2012 | Phuly | |
| 2012/0070233 A1 | 3/2012 | Wang et al. | |
| 2012/0151860 A1 | 6/2012 | Li | |
| 2012/0266447 A1 | 10/2012 | Diaz-Vallellanes | |
| 2012/0314540 A1 | 12/2012 | Alter | |
| 2013/0129474 A1 | 5/2013 | Schacknies et al. | |
| 2013/0255169 A1 * | 10/2013 | Henderson | E02D 5/80 52/223.13 |
| 2014/0255106 A1 * | 9/2014 | Henderson | E02D 5/34 405/256 |
| 2014/0260223 A1 | 9/2014 | Long et al. | |
| 2015/0376859 A1 | 12/2015 | Phuly | |
| 2016/0097179 A1 * | 4/2016 | Henderson | E02D 27/425 52/158 |
| 2017/0044733 A1 * | 2/2017 | Henderson | E02D 27/425 |
| 2018/0119381 A1 * | 5/2018 | Garcia | E02D 27/50 |
| 2018/0264680 A1 | 9/2018 | Phuly | |
| 2019/0323197 A1 * | 10/2019 | Huo | E02D 27/50 |
| 2020/0018035 A1 * | 1/2020 | Schuldt | E04H 12/08 |
| 2020/0032478 A1 | 1/2020 | Rajewski | |

FOREIGN PATENT DOCUMENTS

| | | |
|---|---|---|
| DE | 10105472 | 8/2002 |
| DE | 202012006606 | 11/2012 |
| EP | 0160135 | 11/1985 |
| EP | 1526278 | 4/2005 |
| FR | 2833029 | 6/2003 |
| JP | 60-92518 | 5/1985 |
| JP | 61-109826 | 5/1986 |
| JP | 64-71987 | 3/1989 |
| JP | 4-353117 | 12/1992 |
| JP | 5-311678 | 11/1993 |
| JP | H5-311678 | 11/1993 |
| JP | 8-338034 | 12/1996 |
| JP | 9-256390 | 9/1997 |
| JP | 11-181797 | 7/1999 |
| JP | 2001-200582 | 7/2001 |
| JP | 2002-061201 | 2/2002 |
| JP | 2003-013442 | 1/2003 |
| JP | 2003-232046 | 8/2003 |
| JP | 2005-220554 | 8/2005 |
| JP | 2010-65454 | 3/2010 |
| KR | 2001/0057453 | 7/2001 |
| WO | WO 84/03531 | 9/1984 |
| WO | WO 02/27105 | 4/2002 |
| WO | WO 02/099204 | 12/2002 |
| WO | WO 2011/029994 | 3/2011 |
| WO | WO 2012/037450 | 3/2012 |
| WO | WO 2012/062425 | 5/2012 |

OTHER PUBLICATIONS

Declaration of Dr. John T. Bryant in Support of Petition for Inter Partes 7,533,505 (filed Sep. 9, 2021).
Declaration of Dr. John T. Bryant in Support of Petition for Inter Partes 7,707,797 (filed Sep. 9, 2021).
Newman, Morton. Structural Details for Concrete Construction. McGraw Hill Book Company, 1998.
Peck et al. Foundation Engineering, Second Edition, John Wiley & Sons, 1953.
Federal Highway Administration Transportation. Geotechnical Engineering Circular N. 4, Ground Anchors and Anchored Systems, Jun. 1999.
Petition for Inter Partes Review of U.S. Pat. No. 7,533,505 filed Sep. 10, 2021.
Petition for Inter Partes Review of U.S. Pat. No. 7-618,217 filed Sep. 10, 2021.
Petition for Inter Partes Review of U.S. Pat. No. 7.707,797 filed Sep. 10, 2021.
Post-Tensioning Manueal, Fifth Edition, Post-Tensioning Institute, 1990.
Prestressed Concrete, PCA America's Cement Manufacturers, 1916.
Kelley. A. Short History of Unbounded Post—Tensioning Specifications, Concrete Repair Bullentine, Jul./Aug. 2001.
Design Examples: Attachment 8.
Nigels, McLeod C. Prestressed Conrete Tension Piles and Their Connections, PCI Journal, Jul.-Aug. 1988.
Reflections on the Beginnings of Prestressed Concrete in America, The Prestressed Concrete Institute, 1981.
U.S. Department of Transportation Federal Highway Administration. Post-Tensioning Tendon Installation and Grouting Manuarl, Version 2.0, May 2013.
Aschenbroich, Horst. Dipl. Ing. A Post Tensioned Micropile Foundation System with Groutable Void Forms (GVF).
Aschenbroich, Horst, Dipl. Ing. Micro Pile Reinforcement Systems and Corrosion Protection, 2001.

(56) References Cited

OTHER PUBLICATIONS

Deformation of Reinforced Concrete Anchor Foundations in the Far Norht, Plenum Publishing Corporation, 1991.
Crabtree et al. The Strengthening of Transmission Tower Foundations Using Grouted Anchor Bars.
Kim, Nak-Kyung. Performance of Tension and Compression Anchors in Weathered Soil. Journal of Geotechnical and Geoenvironmental Engineering, Dec. 2003.
Dams—Innovations for Sustainable Water Resources, 22nd Annual USSD Conference San Diego, California, Jun. 24-28, 2002.
Prestressed Concrete Bridges.
Wind Turbine Anchoring Solutions, Peikko Group, Concrete Connections.
Standard Specification for Steel Strand, Uncoated Seven-Wire for Prestressed Concrete, ASTM International.
Allam et al. Crack width evaluation for flexural RC members. Alexandria Engineering Journal, (2012) 51, 211-220.
Svensson, Henrick. Design of Foundations for Wind Turbines, 2010.
Eurooppalainetekninen hyväksyntä. ETA-10/02; European Technical Approval. VTT Expert Services Oy. Issued Apr. 21, 2011.
Bruce et al. Foundation Rehabilitation of the Pocomoke River Bridge, Maryland, Using High Capacity Preloaded Pinpiles, The Conference on Bridges official proceedings. Jun. 4-6, 1984.
Peikko's Foundation Solution Chosen for Wing for Wing Park to be Built in Hamina, Finland. https://web.archive.org/web/20111228043258/http://www.peikko.com/news/n=Peikko%27s+Foundation+Solution+choses+for+Wind+Park+to+be+builtin+in+Hamina%2c+Finland.
Hevosselkä Wind Park, Tervola, Finland, https://www.peikko.com/reference/hevosselka-wind-park.
Loflin, Bryan J. Bond and Material Properties of Grade 270 and Grade 300 Prestressing Strands. Jun. 10, 2008.
Peikko to supply the wind turbine tower foundation solution to Finnish Muukko wing park. https://web.archive/org/web/20121001214327/http://www.peikko.com/news/n=Peikko+to+supply+the+wing+lurbine+tower+foundation+solution+to+Finnish+Muukko+wing+park.
Muukko Wind Park, Lappeenranta, Finland, https://www.peikko.com/reference/muukko-wind-park/.

Mäkelänkangas Wind Park, Hamina, Finland, https://www.peikko.com/reference/makelankangas-wind-park/.
https://web.archive.org/web/20121003065612/http://www.peikko.com:80/news/year=2012.
Peikko and Enercon to Expand Their Cooperation. Press Release 4.5.2011. https://web.archive/org/web/20110814012119/http://www.peikko.com/news/n=Peikko+and+Enecon+to+expand+their+cooperation.
Peikko to supply the wind turbine tower foundation solution to Finnish Muukko wind park. https://www.peikko.cz/novinky/peikko-to-supply-the-wind-turbine-tower-foundation-solution-to-finnish-muukko-wind-park-2/.
Peikko Group: Product Catalogue. Jul. 2, 2012.
Aschenbroich, Horst Dipl.Ing. Reinforcement of dams in Canada and the USA. Www.contechsystems.com.
https://web.arcive.org/web/20121003064830/http://www.peikko.com/news/year=2012/month=05.
Wind Turbines Uljabuouda, Sweden, Project Story in PeikkoNews Feb. 2009. https://web.archive.org/web/20120320121335/http:www.peikko.com/reference-main/references/rg=Power+Plants+and+Llnes/r=Wind+Turbines+Ulkabuouda+%2C+Sweden.
A unique turnkey solution for wind turbine tower foundations. https://web.archive.org/ . . . b/20120403071116/http://www.peikko.com/solutions-category/solutions/s=A+unique+turnkey+solution+for+wind+turbine+tower+foundations/sid=24072976.
Clemence, Samuel P., Uplift Behavior of Anchor Foundations in Soil. Proceedings of a session sponsored by the Geotechnical Engineering Division of the American Society of Civil Engineers in conjunction with the ASCE Convention in Detroit, Michigan. Oct. 24, 1985.
Benefits for wind energy specialist. https://web.archive/org/web/20121030175316/http://www.peikko.com/group/t=Wind+Energy+Specialist.
Affidavit of Josef Alter in U.S. Appl. No. 11/428,778, executed on Jun. 2, 2009.
Video by Peiiko Group uploaded to YouTube on Apr. 13, 2012. https://urldefense.com/v3/ https://youtu.be/j7k-ayGWfh4__;!!JrcugBw_IQ!3puXZHUFb4eyZpuDPdTKr3XTjcljogtpuEEdpwCGStoa9L6X9-0D1V2Ngk3NmsUcbQ5I$.

* cited by examiner

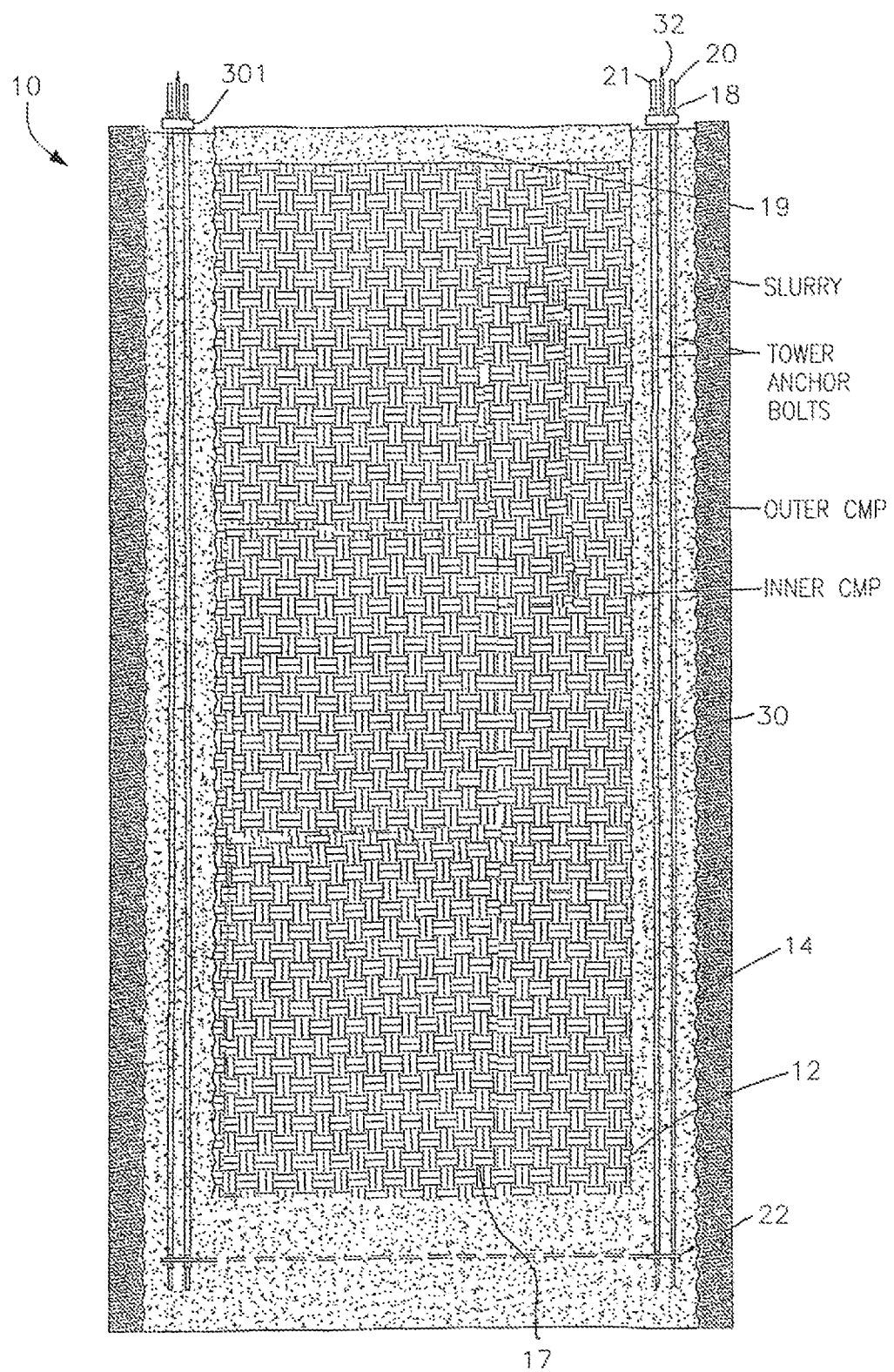
FIG. 1 — PRIOR ART

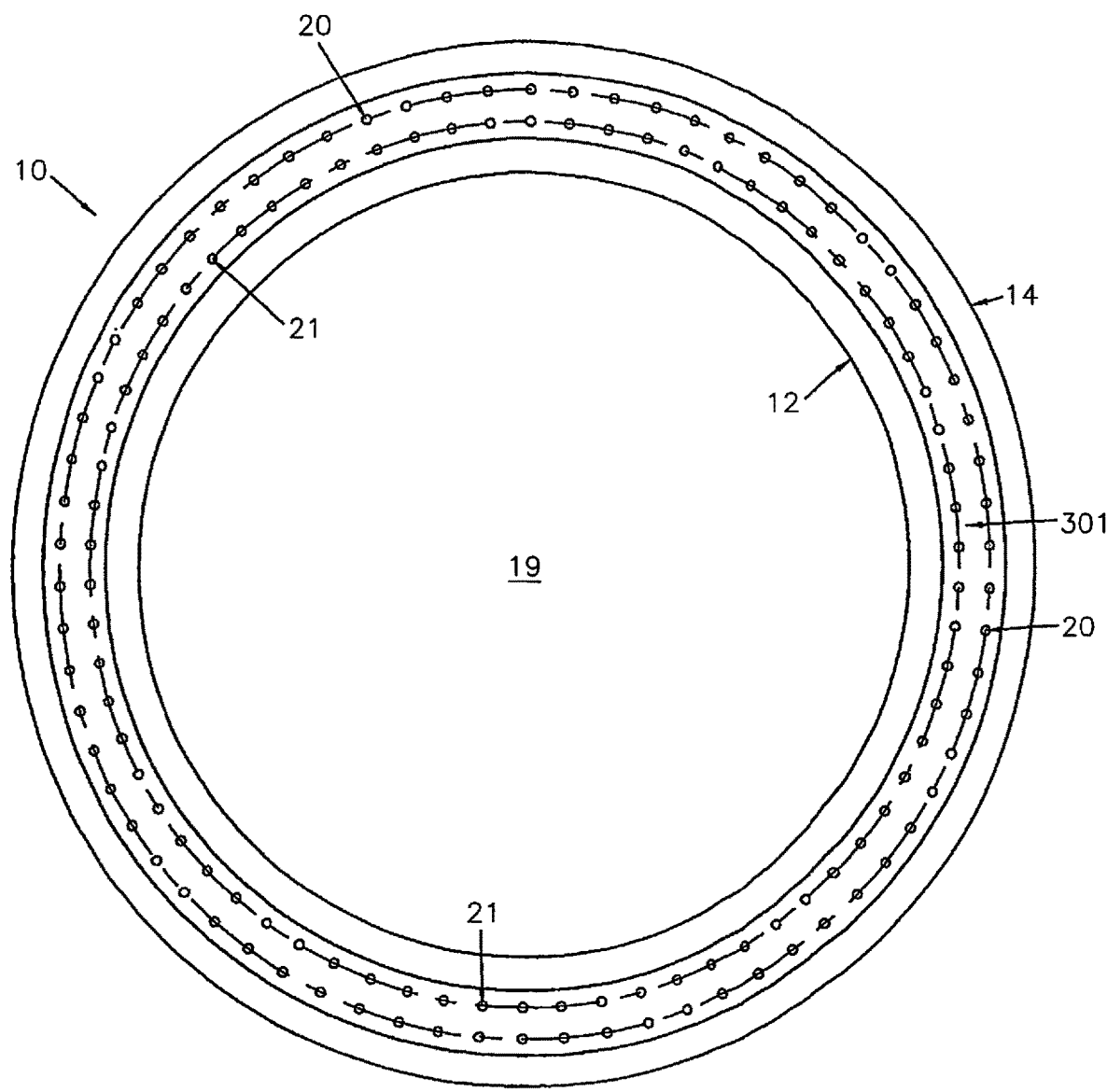
FIG. 1A – PRIOR ART

REINFORCEMENT STRUCTURES FOR TENSIONLESS CONCRETE PIER FOUNDATIONS AND METHODS OF CONSTRUCTING THE SAME This application claims priority from U.S. provisional application Ser. No. 62/799,359, filed Jan. 31, 2019.

BACKGROUND OF THE INVENTION

Field of the Invention

The present invention relates to one or more reinforcement structures for tensionless concrete pier foundations used to support tall, heavy and/or large towers and the like, and to methods ox constructing reinforced tensionless concrete pier foundations and to retrofitting existing tensionless concrete pier foundations with reinforcement structures.

Description of the Related Art

Concrete foundation structures of various kinds have been developed to support commercial signs, traffic signs, light poles and the like. To support larger structures including tall and heavy towers and wind turbines that exert significant overturning force on the foundation, Applicant developed and commercialized tensionless pier foundations as described in U.S. Pat. No. 5,586,417 ("the '417 patent"). The '417 patent is hereby expressly incorporated by reference as if fully set forth in its entirety herein.

The tensionless pier foundation described in the '417 patent includes a concrete foundation formed as a cylinder having an outer boundary shell defined by a corrugated metal pipe (CMP) and an inner boundary formed by a second CMP of smaller diameter, with the upper ends of both CMPs being below the top of the foundation. Elongated high strength steel bolts run from an anchor flange near the bottom of the concrete cylinder vertically up through the concrete to extend above the upper end of the foundation and through a connecting flange for the supported structure to be connected on top of the foundation. The bolts are encased in sleeves or hollow tubes over a substantial portion of their vertical extent in the concrete to allow the encased portion of the bolts to be stretched and thus tensioned. With such tensioning of the bolts, the concrete is kept under constant compression while the bolts are always in static tension. Thus, the pier foundation in the '417 patent is referred to as "tensionless" due to the absence of tensile stress on the concrete.

The '417 patent construction was a significant improvement over previously known concrete foundations that incorporated a reinforcing steel bar matrix and were subject to repeatedly alternating tensile and compressive loads on the steel bar matrix, leading to fatigue and, in many cases, premature failure. Additional improvements in tensionless concrete foundations are shown in Applicant's other U.S. Pat. No. 8,720,139 ("the '139 patent") and U.S. Pat. No. 9,340,947 ("the '947 patent"), among others. The complete disclosures of the '139 and '947 patents are hereby expressly incorporated by reference as if fully set forth in their entirety herein.

While the tower-supporting tensionless concrete pier foundation disclosed in the '417 patent is strong and long lasting in use, in at least some cases concrete pier foundations of similar construction would benefit from added reinforcement to increase the overturning (upset) moment capacity and also to reduce movement and deflection of the top of the tensionless pier.

Therefore, it would be beneficial to incorporate one or more reinforcement structures within both new and retrofit constructions of tensionless concrete pier foundations to improve the strength, operational effectiveness and structural integrity of such foundations over the life thereof.

SUMMARY OF THE INVENTION

In view of the foregoing, the present invention is directed to reinforced tensionless concrete pier foundations, reinforcement structures for such foundations, and methods of constructing such foundation, including the retrofitting of existing tensionless concrete pier foundations to include one or more reinforcement structures. The foregoing reinforcement structures act to provide one or more of increased lateral stiffness, shear resistance and overturning (upset) moment capacity to the pier; reduced movement, bending and deflection of the top of the pier; and improved conditioning, containment, skin friction and lateral bearing capacity of the surrounding soil and/or rock substrate that supports the tensionless pier.

As in the '417 patent, the reinforced tensionless concrete pier foundation to which the present invention is directed includes a plurality of elongated tower anchor bolts embedded within sleeves in a concrete pier and secured at their lower ends to an anchor or embedment ring. The tower anchor bolts and embedment ring are received within an annular space formed between an outer corrugated metal pipe (CMP) and an inner CMP having a smaller diameter than the outer CMP. The upper ends of the tower anchor bolts extend above the top of the concrete so that the bolts, which bear the tensile load, can be post-tensioned to keep the concrete pier under constant compression in like manner to the tensionless concrete pier foundation construction described in the '417 patent. These post-tensioned tower anchor bolts are also referred to herein as tensioning tower anchor bolts. And like the pier foundation in the '417 patent, the reinforced concrete pier foundation according to the present invention is also referred to as a "tensionless" pier foundation due to the absence of tensile stress on the concrete.

According to a first embodiment, the tensionless concrete pier foundation according to the present invention is provided with a structural post-tensioned collar that can be added during original construction or as a retrofit to an existing pier to increase foundation stiffness and load-bearing capacity. The outer perimeter of the post-tensioned collar is defined by an outer collar CMP that surrounds the original outer CMP of the pier (the "outer pier CMP") to create an annular space that is filled with concrete, preferably 6000 psi concrete. Embedded within the concrete, the collar preferably includes shear steel, such as an inner collar CMP placed between the outer collar CMP and the outer pier CMP before the concrete is poured, and sleeved radially-extending horizontal bolts that connect the collar to the pier. The radially-extending horizontal bolts are tensioning bolts that, when post tensioned after concrete pour and set-up, provide tension steel for minimizing bending of the collar and enable the collar to share the overturning (upset) loads otherwise borne by the concrete pier alone. The structural collar can also support soil and rock anchor additions that extend vertically through the collar and into the underlying soil and/or rock substrate to increase the capacity and stiffness of the tensionless pier foundation.

To provide additional stiffness to the pier foundation according to the first embodiment, the inner CMP of the pier (the "inner pier CMP") is filled with concrete from the top to the depth of the collar, preferably on the order of about 5 feet deep, to form what is referred to herein as a deep concrete floor addition. The deep concrete floor addition in the center of the pier provides structural bending resistance and prevents distortion of the top of the tensionless pier while also providing the floor for the foundation.

According to a second embodiment, the present invention is directed to an extended base flange support (EBFS) repowering addition for an existing tensionless concrete pier foundation that enables the existing pier foundation to support a somewhat larger tower than that for which the foundation was originally constructed. The EBFS repowering addition includes a repowering addition CMP that surrounds the outer pier CMP to define an annular space, approximately 2 feet wide and 6 feet deep, that is filled with, concrete to form a repowering collar. The EBFS repowering collar further includes lateral reinforcing bolts, a tower base insert, and auxiliary tensioning tower anchor bolts. The lateral reinforcing bolts extend across the annular space and couple the EBFS repowering addition CMP to the inner and outer pier CMPs. These lateral reinforcing bolts are also post-tensioned to provide tension steel for minimizing bending of the repowering addition. The tower base insert acts to provide a wider support surface on the upper surface of the repowering collar to accommodate the base flange of a larger tower and is supported by the existing tower anchor bolts as well as by the auxiliary tensioning tower anchor bolts.

To support much larger towers, the repowering addition can be configured as a replacement base flange support (R5FS) repowering addition. The RBFS repowering addition also includes a repowering addition CMP but one that is larger in diameter than that used with the EBFS repowering addition in order to create an annular space between the RBFS repowering addition CMP and the outer pier CMP that is about 4 feet wide and 6 feet deep. Further, the RBFS repowering assembly provides stand alone tower base support that is spaced outwardly from, and functionally replaces, the existing support surface for the tower connection flange and is supported by tensioning repowering addition tower anchor bolts that keep the addition under constant compression. The repowering addition tower anchor bolts, which are generally 1.5 inch bolts 7 feet in length, extend vertically through the concrete of the repowering addition collar, generally parallel with the outer pier CMP and the repowering addition CMP. Like the EBFS repowering addition, the RBFS repowering addition also includes lateral reinforcing bolts that extend across the annular space between the repowering addition CMP and the outer pier CMP, and into the annular concrete ring formed between the inner and cuter pier CMPs. Both the smaller EBFS and the larger RBFS repowering additions allow a tower having a commensurately larger diameter to be connected to the existing foundation for retrofitted repowering, saving the cost and time required to remove the original foundation and construct a new foundation.

According to a third embodiment, the present invention is directed to a soil condition improvement collar for an existing tensionless concrete pier foundation or for a new construction. The soil condition improvement collar includes a soil improvement CMP that surrounds the outer pier CMP, and is about 5 feet larger in diameter and about 5 feet deep, to define an annular area that is filled with concrete, preferably 3000 psi concrete, to form the soil condition improvement collar which acts to improve the integrity of the surrounding ground material, i.e., the soil and/or rock substrate, to reduce pier movement and soil cracks at the surface.

According to a fourth embodiment, the present invention is directed to buttress additions for a new pier construction, to retrofit an existing pier foundation, or to support future repowering of the tower or turbine supported on the foundation. The buttress additions are preferably embodied as individual concrete blocks or reinforcements, each approximately 4 ft wide, 5 ft long and 10 ft deep, that are spaced around the outer perimeter of the pier foundation and may be precast or formed in situ. The buttress additions increase the overall load capacity and stiffness of the pier foundation while also providing deep-level soil improvement. Further, the buttress additions require less concrete than full encircling-type collars, and the buttress additions do not interfere with, or require encasement of, the electrical conduits which facilitates ease of construction.

According to a fifth embodiment, the present invention includes pressure grouting around an existing pier foundation to stabilize the surrounding soil and to increase the load capacity of the pier foundation by expanding the diameter of the cementitious materials horizontally supporting the pier. According to this embodiment, a grout emitting pipe is driven into the soil surrounding the outer pier CMP to the desired soil depth adjacent the base of the foundation, followed by pressure grouting to several hundred psi at 5 ft intervals as the grouting pipe is lifted upwardly. Pressure grouting in this way can be performed immediately after construction or years later to increase the pier's resistance to lateral movement and also improve foundation stiffness. Pressure grouting for soil stabilization also increases the lateral bearing capacity of the surrounding soil and increases the akin friction around the perimeter of the pier foundation.

The present invention is also directed to a method of constructing a post-tensioned reinforcement collar for a tensionless concrete pier foundation having inner and outer pier CMPs as shown in the '417 patent. The outer perimeter of the collar is bounded by a collar CMP and the collar is secured to the inner and outer pier CMPs with a plurality of lateral reinforcing bolts that extend through the three CMPs, spanning the annular spaces between the inner and outer pier CMPs and between the outer pier CMP and the collar CMP. The lateral reinforcing bolts are nutted both outside the collar CMP and inside the inner pier CMP and can include an upper set of lateral reinforcing bolts near the top of the CMPs and a lower set of lateral reinforcing bolts near the bottom of the CMPs.

According to the method, when constructing a new tensionless pier foundation, the lateral reinforcing bolts of the post-tensioned collar are added before the foundation concrete is poured. The concrete for the tensionless pier can be poured monolithically or a plurality of pours may be placed separately. The bolts are nutted against the inner pier CMP and the collar CMP to retain post-tension loads after both pier and collar concrete cure.

The post-tensioned collar can also be added to an existing tensionless pier foundation for retrofit or repowering with a larger turbine. The preferred method of adding the post-tensioned collar as a retrofit includes removing the floor as well as the soil within the cylindrical space defined by the inner pier CMP to the depth of the collar/ and drilling holes for insertion of the horizontally-extending lateral bolts through the inner pier CMP, the annular concrete ring between the inner and outer pier CMPs, the outer pier CMP, the annular space between the outer pier CMP and the collar CMP, and the collar CMP. The bolts are inserted through the drilled holes and nutted against the inner pier CMP and against the outer surface of the collar CMP during post tensioning. In such a retrofit construction, the deep concrete floor addition can be incorporated within the retrofit collar addition by pouring the deep concrete floor after the concrete in the annular space between the collar CMP and the outer pier CMP has been poured and cured and the bolts post tensioned, effectively replacing the previously existing floor and soil fill which was removed to install the retrofit collar.

Whether the retrofit collar is added during original construction or as a retrofit to an existing tensionless pier foundation, the soil and/or rock anchor additions are placed within drilled holes prior to concrete pour in the collar. Rock anchors are installed in drilled holes, such as percussion drilled holes, and are grouted to within a few inches below the bottom of the collar while the upper end of the rock anchor bolt extends to the design height above the collar. Soil anchors can be auger cast or driven piles, drilled to the design depth with a sleeved centralized bolt, the piles being backfilled with concrete or grout, and terminated a few inches below the bottom of the collar with the sleeved bolt extending above the top of the collar to the design height. As used herein, the "design height" and the "design depth" are that height and depth corresponding with the desired height or depth, respectively, as planned for the particular construction.

Soil anchors can also be helical anchors drilled to the design depth with a tube or bolt, central to the helices, having an upper end extending to the design height above the collar. Such helical anchors can be pressure grouted, if required, to increase anchor capacity. Displacement anchors can be drilled and grouted to design depth with the displacement section of the anchor terminating inches below the bottom of the collar and with the upper end of the central sleeved bolts extending to the design height above the collar.

Similar method steps to those just described in connection with the reinforcement collar are followed for construction of the repowering additions except that with the repowering additions the tower anchor bolts are sleeved rather than soil and/or rock anchor bolts.

Accordingly, it is an object of the present invention to provide one or more reinforcement structures to a tensionless concrete pier foundation that increase lateral stiffness, shear resistance and overturning (upset) moment capacity of the pier, and that reduce movement, bending, displacement, and deflection of the top of the pier. The reinforcement structures may also serve to improve the conditioning, containment, skin friction and lateral bearing capacity of the surrounding soil and/or rock substrate that supports the tensionless pier.

Another object of the present invention is to provide one or more reinforcement structures to a tensionless concrete pier foundation in accordance with the preceding object in which the reinforcement structure includes a structural post-tensioned collar added during original construction or as a retrofit to an existing tensionless pier foundation to increase foundation lateral stiffness, overturning resistance, and load-bearing capacity, the outer perimeter of the post-tensioned collar being defined by an outer collar CMP that surrounds the outer pier CMP to create an annular space that is filled with concrete, preferably 6000 psi concrete.

Yet another object of the present invention is to provide a reinforced tensionless concrete pier foundation in accordance with the preceding object in which the reinforcement collar includes an inner collar CMP placed between the outer collar CMP and the outer pier CMP before the concrete is poured, the inner collar CMP increasing the shear strength of the reinforcement collar.

Still another object of the present invention is to provide a reinforced tensionless concrete pier foundation in accordance with the preceding two objects in which the reinforcement collar includes sleeved radially-extending horizontal bolts that connect the collar to the pier and, when post tensioned after concrete pour and set, provide tension steel for minimizing bending of the collar and enable the collar to share the overturning (upset) loads otherwise borne by the concrete pier alone.

A further object of the present invention is to provide a reinforced tensionless concrete pier foundation in accordance with the three preceding objects in which the structural post-tensioned collar supports soil and/or rock anchor additions that extend through the collar and into the underlying soil and/or rock substrate to increase the capacity and stiffness of the tensionless pier foundation.

Yet a further object of the present invention is to provide a reinforced tensionless concrete pier foundation in accordance with at least one of the preceding four objects in which the inner pier CMP is filled with concrete from the top to the depth of the collar, preferably on the order of about 5 ft deep, to form a deep concrete floor addition that provides structural bending resistance and prevents distortion of the top of the tensionless pier while also providing the floor for the foundation.

Another object of the present invention is to provide a reinforcement structure for a tensionless concrete pier foundation in which the reinforcement structure includes a repowering addition for an existing tensionless concrete pier foundation that includes a repowering addition CMP, a plurality of lateral reinforcing bolts, and additional tensioning tower anchor bolts, the repowering addition CMP surrounding the outer pier CMP of the foundation to define an annular space and the lateral reinforcement bolts extending across the annular space and coupling the repowering addition CMP to the inner and outer pier CMPs, concrete being poured to fill the annular space with the lateral reinforcement bolts embedded therein, the repowering addition enabling the existing pier foundation to support a larger tower than that for which the foundation was originally constructed, saving the cost and time required to remove the original foundation and construct a new foundation.

Still another object of the present invention is to provide a reinforced tensionless concrete pier foundation in accordance with the preceding object in which the repowering addition includes a tower base insert that creates an extended base flange support (EBF5) repowering addition, the tower base insert of the EBFS repowering addition providing an extended support surface on the upper surface of the repowering collar to accommodate the base flange of a somewhat larger tower.

Yet another object of the present invention is to provide a reinforced tensionless concrete pier foundation in accordance with the object before the preceding object in which the repowering addition includes a replacement base flange support (RBFS) repowering addition that forms a stand alone support for the tower connection flange that is spaced outwardly from, and functionally replaces, the existing tower support surface for the tower connection flange and is supported by repowering addition tensioning tower anchor bolts that extend vertically through the concrete of the repowering addition collar, generally parallel with the outer pier CMP and the repowering addition CMP, the RBFS repowering addition enabling the previously existing pier foundation to support a much larger tower than that for which the foundation was originally constructed.

A further object of the present invention is to provide a reinforcement structure for a tensionless concrete pier foundation in which the reinforcement structure includes a soil condition improvement collar for an existing tensionless concrete pier foundation or for a new construction, the soil condition improvement collar including a soil improvement CMP that surrounds the outer pier CMP, preferably being about 4-5 feet larger in diameter, to define an annular area about 5-6 feet deep that is filled with concrete, preferably 3000 psi concrete, to improve the integrity of the surrounding ground material, i.e., the soil and/or rock substrate, and to reduce pier movement and soil cracks at the surface.

Yet a further object of the present invention is to provide a reinforcement structure for a tensionless concrete pier foundation in which the reinforcement structure includes buttress additions for a new pier construction, to retrofit an existing pier foundation, or to support future repowering of the tower or turbine supported on the foundation, the buttress additions being embodied as individual concrete blocks or reinforcements, precast or formed in situ, each approximately 4 feet wide, 5 feet long and 10 feet deep, and being spaced around the outer perimeter of the pier foundation to increase the overall load capacity and stiffness of the pier foundation and provide deep-level soil improvement around the pier foundation.

A still further object of the present invention is to provide a reinforcement structure for a tensionless concrete pier foundation in which the reinforcement structure includes grout stabilized soil around the perimeter of the foundation to increase the lateral bearing capacity of the surrounding soil by expanding the diameter of the cementitious materials horizontally supporting the pier and by increasing the skin friction around the perimeter of the pier foundation.

Another object of the present invention is to provide a method of stabilizing the soil in accordance with the previous object that includes driving a grout emitting pipe to the desired soil depth adjacent the base of the foundation and pressure grouting to several hundred psi at 5 ft intervals as the grouting pipe is lifted upwardly/ the method being able to be performed immediately after construction or years later to improve the pier's resistance to lateral movement.

Yet another object of the present invention is to provide a method of constructing a tensionless concrete pier foundation having inner and outer pier CMPs to include a post-tensioned reinforcement collar during original construction, the method including placing a collar CMP around the outer pier CMP, installing lateral reinforcing bolts that extend through the collar CMP and the inner and outer pier CMPs, the bolts spanning the annular spaces between the inner and outer pier CMPs and between the outer pier CMP and the collar CMP, nutting the lateral reinforcing bolts both outside the collar CMP and inside the inner pier CMP, pouring concrete into the annular spaces, and post-tensioning the lateral reinforcing bolts after concrete cure.

Still another object of the present invention is to provide a method of retrofitting a tensionless concrete pier foundation having inner and outer pier CMP8 with a post-tensioned reinforcement collar, the method including removing the floor as well as the soil within the cylindrical space defined by the inner pier CMP to the depth of the collar, drilling holes for insertion of horizontally-extending lateral bolts through the inner pier CMP, the annular concrete ring between the inner and outer pier CMPs, the annular space between the outer pier CMP and the collar CMP, and the collar CMP, inserting the bolts through the drilled holes and nutting the bolts against the inner surface of the inner pier CMP and against the outer surface of the collar CMP during post, tensioning thereof.

Still a further object of the present invention is to provide a method of retrofitting a tensionless concrete pier foundation with a post-tensioned reinforcement collar in accordance with the preceding object in which the method further includes pouring a deep concrete floor addition into the cylindrical space after the concrete in the annular space between the collar CMP and the outer pier CMP has been poured and cured and the bolts post tensioned, the deep concrete floor addition replacing the soil and floor that were removed to install the retrofit collar.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 shows a tensionless concrete pier foundation suitable for reinforcement with one or more reinforcement structures and methods according to the present invention.

FIG. 1A is a top view of the foundation shown in FIG. 1.

DETAILED DESCRIPTION OF THE PREFERRED EMBODIMENTS

Figure 2:
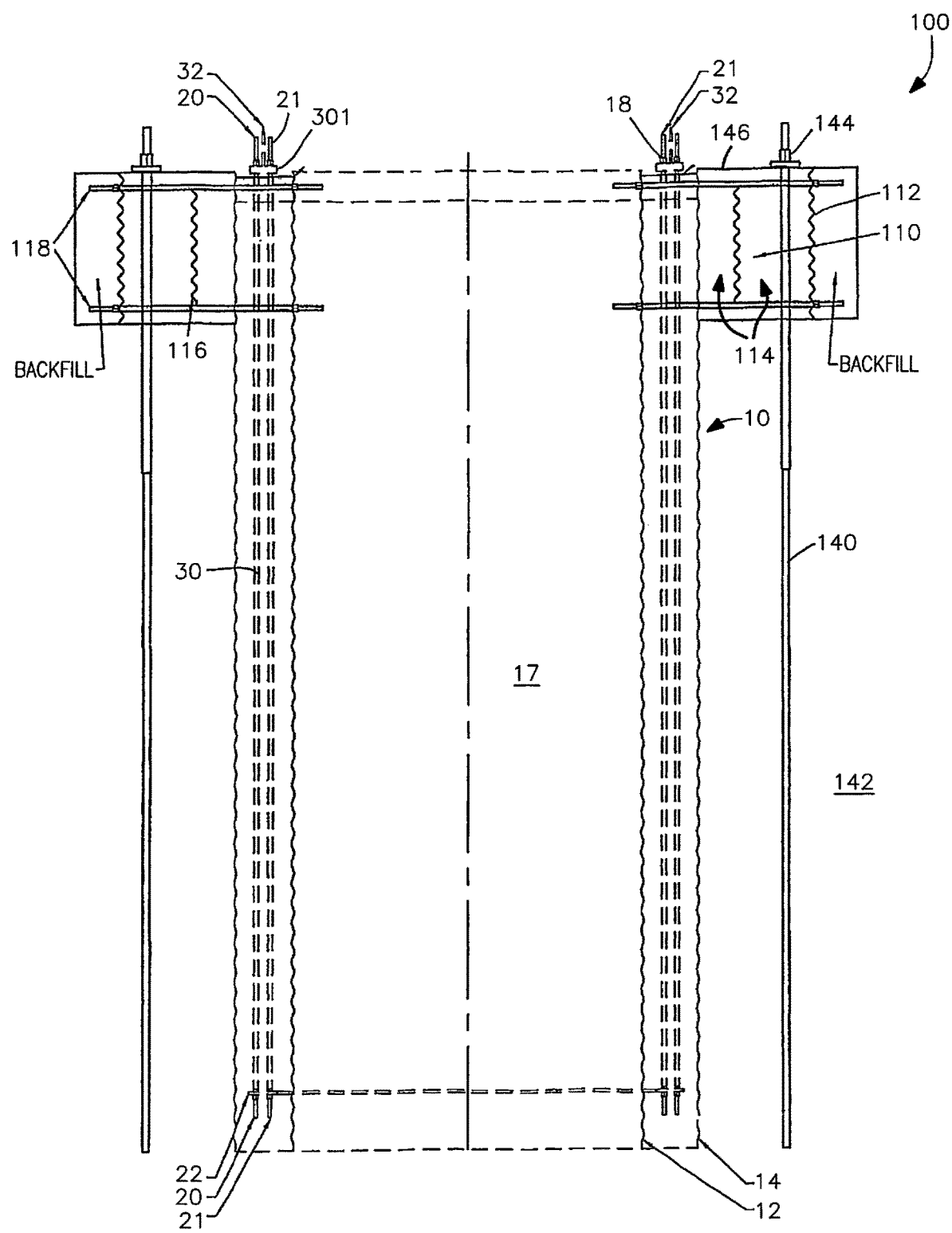
FIG. 2 is a cross-sectional side view of a tensionless concrete pier foundation reinforced with a post-tensioned collar in accordance with a first embodiment of the present invention.

It is to be understood that the embodiments described herein are disclosed by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

A tensionless concrete pier foundation like that disclosed in the '417 patent is shown in FIGS. 1 and 1A. The concrete pier foundation, generally designated by reference numeral 10, includes an inner corrugated metal pipe (CMP) 12 (the "inner pier CMP"), an outer CMP 14 (the "outer pier CMP") and a plurality of tower anchor bolts 20, 21 fitted within sleeves 30. The tower anchor bolts 20, 21 are secured at their lower ends to an anchor or embedment ring 22 and are nutted at their upper ends by nuts 18 against a tower base connection flange 301 upon which a tower 32 is supported. The center area 17 surrounded by the inner CMP 12 may be backfilled with soil or other material with the upper surface having a concrete floor 19. A top view of the foundation (without the tower) is provided in FIG. 1A.

Broadly, and as claimed in the '417 patent, the tensionless pier foundation 10 is an upright cylindrical structure of cementitious material having upper and lower ends, the lower end being embedded within an excavation and the upper end for supporting a tower. At least one set of tower anchor bolts, and preferably two sets of tower anchor bolts 20, 21, are disposed in the upright structure and spaced about a central axis thereof. The lower ends of the bolts are secured to the embedment ring 22 adjacent the lower end of the foundation, and the upper ends project upwardly from the upper end of the foundation. The bolts are shielded against bonding with the cementitious material by sleeves 30. The tower base flange 301 is fitted tightly upon the upper surface of the upright structure. The tower base flange has openings formed therethrough through which the threaded upper ends of the tower anchor bolts 20, 21 are slidingly received. A plurality of nuts 13 are threaded onto the bolt upper ends and tightened downwardly upon the tower base flange sufficiently to place the bolts under heavy tension. As a result, the entire upright cylindrical structure is placed under heavy post-compression. Reference is made to the '417 and '947 patents for a more detailed disclosure of the structure and construction of the basic pier foundation 10 shown in FIGS. 1 and 1A.

As shown in FIG. 2, the present invention is directed to a reinforced tensionless concrete pier foundation generally designated by reference numeral 100. Like the pier foundation 10 shown in FIG. 1, the reinforced tensionless concrete pier foundation 100 includes an inner pier CMP 12, an outer pier CMP 14, and a plurality of elongated tower anchor bolts 20, 21 embedded within sleeves 30 within the annular area between the inner and outer pier CMPs 12, 14.

According to the first embodiment of the reinforced tensionless concrete pier foundation 100 as shown in FIG. 2, the pier foundation is reinforced with a structural post-tensioned collar generally designated by reference numeral 110. The collar 110 can be added during original construction or as a retrofit to an existing pier, and increases the stiffness and load-bearing capacity of the foundation.

The outer perimeter of the post-tensioned collar 110 is defined by an outer collar CMP 112 that surrounds the outer pier CMP 14 to create an annular space generally designated by reference numeral 114 between the outer pier CMP 14 and the outer collar CMP 112. The annular space 114 is filled with concrete, preferably 6000 psi concrete. As used herein, "concrete" is intended to refer to any combination of aggregate, including various aggregate sizes, water and a binding cementitious material such as Portland cement and the like, which may or may not include optional strength and/or consistency additives, and which hardens upon cure as is known in the concrete and masonry fields.

The collar 110 preferably includes shear steel embedded within the concrete, such as an inner collar CMP 116, which is placed between the outer collar CMP 112 and the outer pier CMP 14 before the concrete is poured. Because the Inner collar CMP 116 can be set in one piece, as contrasted with the placing and tying of individual shear steel rebars as was done according to previously known construction methods, the inner collar CMP 116 not only increases the shear resistance in the collar but also expedites collar construction.

The collar 110 also preferably includes sleeved radially-extending horizontal tensioning bolts 118 that connect the collar 120 to the pier 10 and, when post tensioned after concrete pour and set, provide tension steel and lateral stiffness for minimizing bending of the collar and enable the collar to share the overturning (upset) loads otherwise borne by the concrete pier alone.

The structural post-tensioned collar 110 can also support soil and rock anchor additions 140 that extend vertically through the collar and into the underlying soil and/or rock substrate 142 to increase the overturning resistance, load-bearing capacity, and lateral stiffness of the tensionless pier foundation. The soil and rock anchor additions 240 are typically bolts which are secured against an upper surface 146 of the concrete collar with nuts 144.

Figure 3:
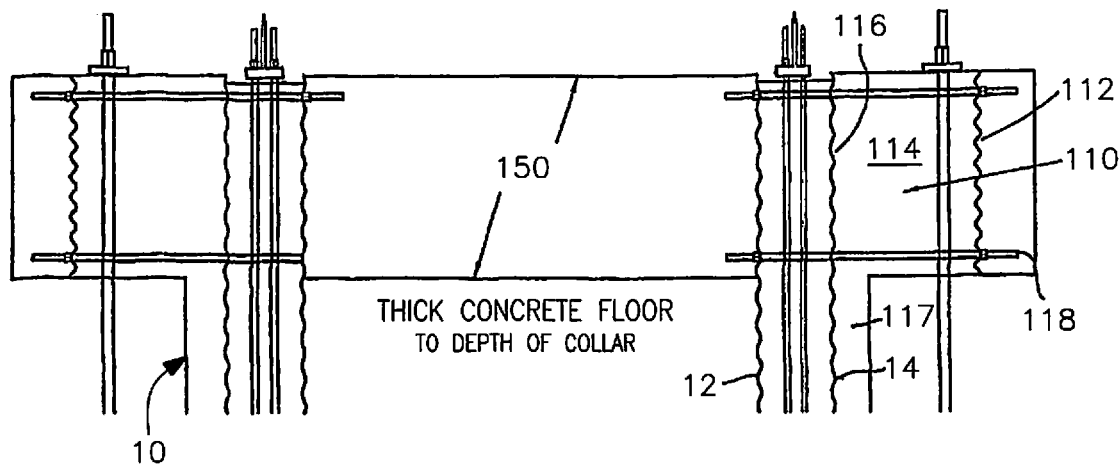
FIG. 3 is a partial view of the components of a tensionless concrete pier foundation reinforced with a post-tensioned collar like that of the first embodiment shown in FIG. 2, and including a deep concrete floor addition in accordance with the present invention.

To provide additional stiffness to the pier foundation according to the first embodiment, the inner pier CMP 12 is filled with concrete from the top to the depth of the collar preferably on the order of about 5 ft deep, to form a deep concrete floor addition 150 as shown in FIG. 3. The deep concrete floor addition 150 in the center area of the pier provides structural bending resistance and prevents distortion of the top of the tensionless pier 10 while also providing the floor for the foundation.

Figure 4:
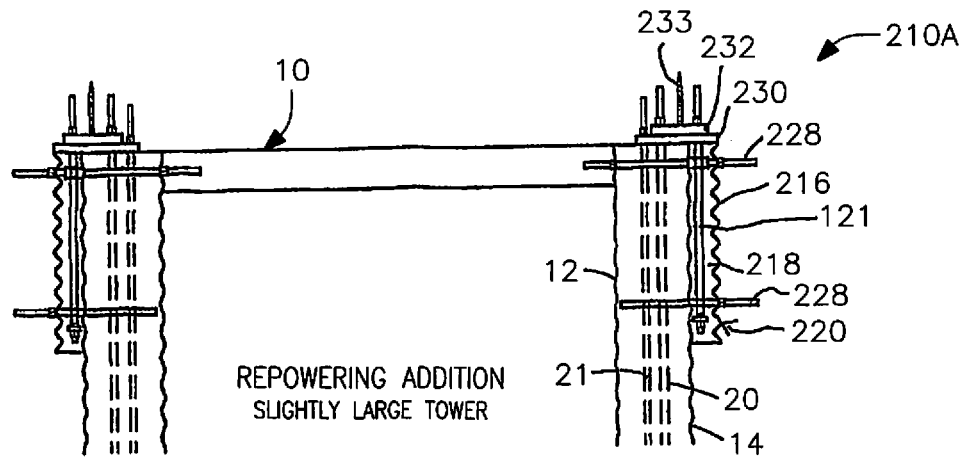
FIG. 4 is a cross-sectional side view of a tensionless concrete pier foundation reinforced with an extended base flange support (EBFS) repowering addition for supporting a larger tower in accordance with a second embodiment of the present invention.
Figure 5:
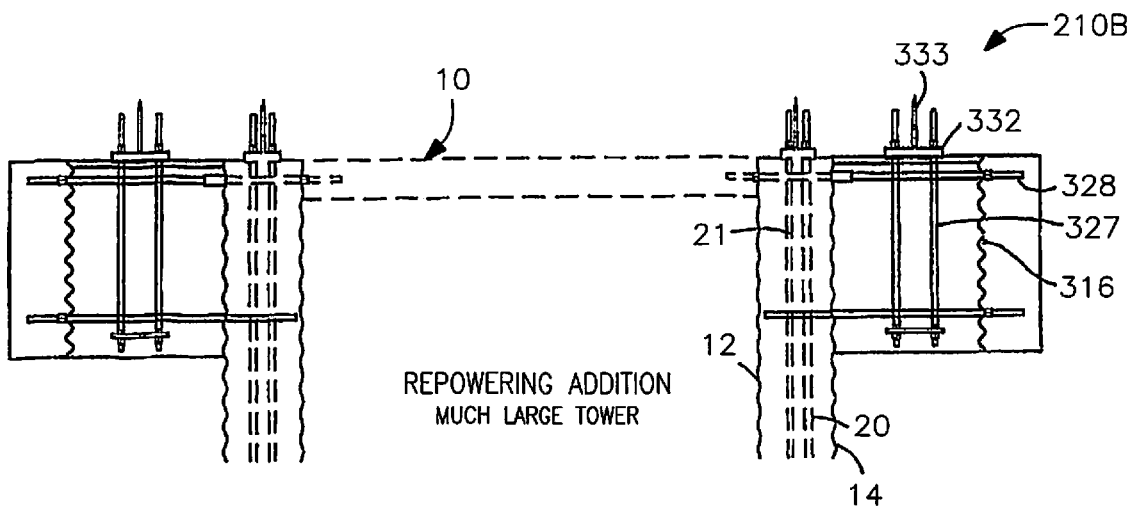
FIG. 5 is a cross-sectional side view of a tensionless concrete pier foundation reinforced with a replacement base flange support (RBFS) repowering addition, also for supporting a larger tower in accordance with the second embodiment of the present invention.

According to a second embodiment of the present invention, the reinforcement structure for the tensionless concrete pier foundation 10 includes a repowering addition generally designated by reference numeral 210A in FIG. 4 and by reference numeral 210E in FIG. 5, and referred to generically herein, when appropriate, as repowering addition 210. The repowering addition 210, when added to an existing tensionless concrete pier foundation 10, enables the existing pier foundation to support a larger tower than that for which the foundation was originally constructed.

The repowering addition shown in FIG. 4 is an extended base flange support (EBFS) repowering addition 210A and is suitable for modifying an existing tensionless concrete pier foundation 10 to support a somewhat larger tower while still utilizing the existing tower anchor bolts 20, 21. The EBFS repowering addition 210A includes a repowering addition CMP 216 that surrounds the cuter CMP 14 of the pier 10 to define an annular space 218. The annular space 218 is approximately 2 ft wide and 6 ft deep, and is filled with concrete to form a repowering collar generally designated by reference numeral 220.

The EBFS repowering addition 210A further includes lateral reinforcing bolts 228, a tower base insert 230, and an auxiliary ring of tower anchor bolts 121. The lateral reinforcing bolts 228 extend across the annular space 218 and couple the EBFS repowering addition CMP 216 to the inner and outer pier CMPs 12, 14. The tower base insert 230 has openings that receive both the existing tower anchor bolts 20, 21 and the auxiliary tower anchor bolts 121 and acts to provide a wider, or extended, support surface on the upper surface of the repowering collar to accommodate the tower base flange 232 of a larger tower 233. The auxiliary tower anchor bolts 121 extend vertically through the concrete of the repowering addition collar 210A, generally parallel with the outer pier CMP and the repowering addition CMP, and are coupled to the tower base flange 232 through the insert 230.

To support much larger towers, the repowering addition can be configured as a replacement base flange support (RBFS) repowering addition 210B, as shown in FIG. 5. The RBFS repowering addition 210B also includes a repowering addition CMP 316 but one that is larger in diameter than that used with the EBFS repowering addition in order to create an annular space 318 between the RBFS repowering addition CMP 316 and the outer pier CMP 14 that is about 4 feet wide and 6 feet deep. Further, the REFS repowering addition provides a stand alone support surface for the tower connection flange 332 of the much larger tower 333. The support surface provided by the RBFS repowering addition 201B is spaced outwardly from, and functionally replaces, the existing tower base support surface for the tower connection flange 301 and is supported by repowering addition tower anchor bolts. The repowering addition tower anchor bolts 327, which are generally 1.5 inch bolts 7 ft in length, extend vertically through the concrete of the repowering addition collar, generally parallel with the outer pier CMP and the repowering addition CMP. Like the EBFS repowering addition, the RBFS repowering addition also includes tensioning lateral reinforcing bolts 328 that extend across the annular space 318 between the repowering addition CMP 316 and the outer pier CMP 14, and into the annular concrete ring formed between the inner and outer pier CMPs. Both the smaller EBFS and the larger PBFS repowering additions allow a tower having a commensurately larger diameter to be connected to the existing foundation for retrofitted repowering, saving the cost and time required to remove the original foundation and construct a new foundation.

Figure 6:
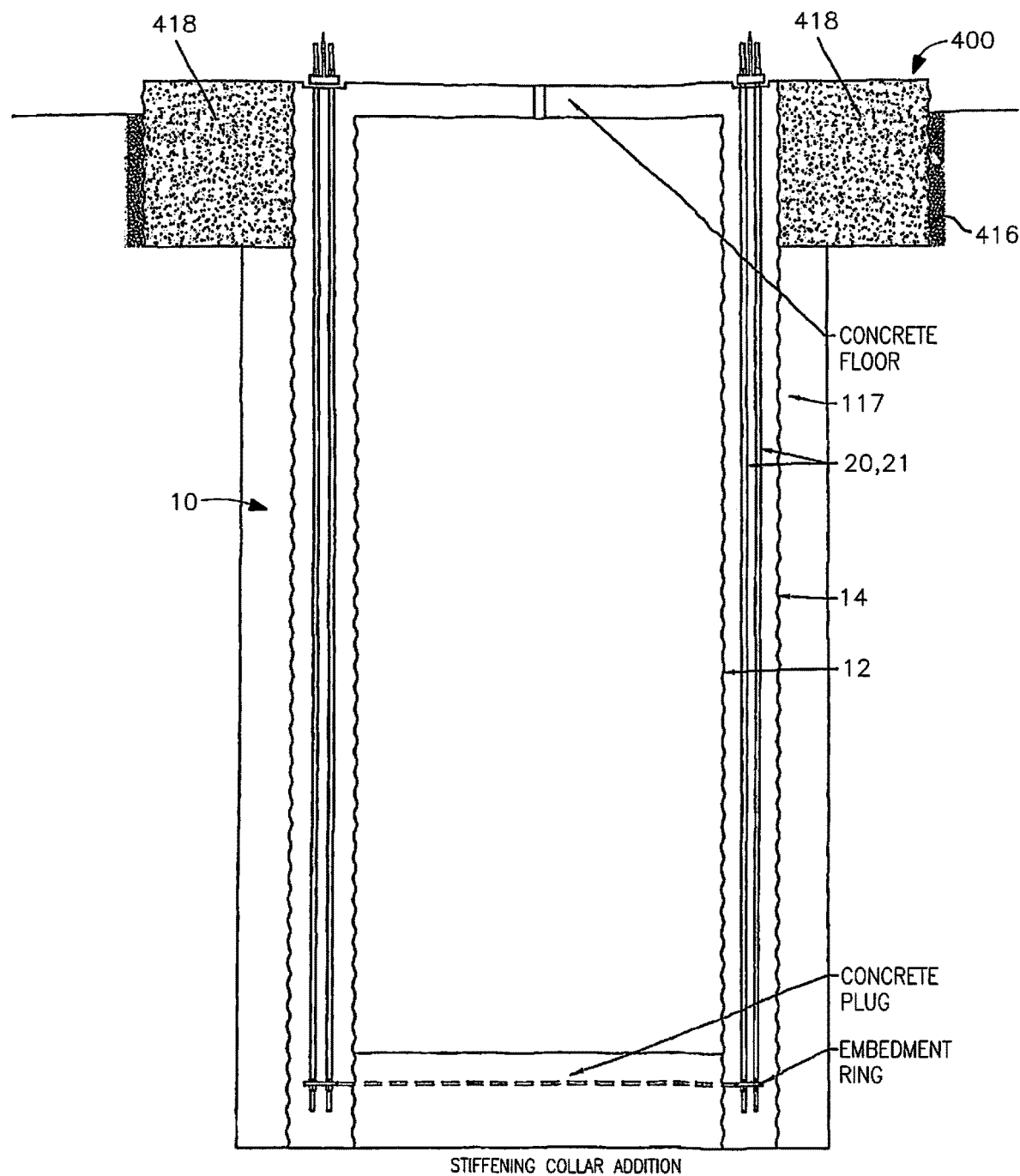
FIG. 6 is a cross-sectional side view of a tensionless concrete pier foundation reinforced with a soil condition improvement collar in accordance with a third embodiment of the present invention.

According to a third embodiment of the present invention, the reinforcement structure for the tensionless concrete pier foundation 10 includes a soil condition improvement collar generally designated by reference numeral 400 as shown in FIG. 6. The soil condition improvement collar can be added to an existing tensionless concrete pier foundation or be constructed concurrently with a new pier construction.

The soil condition improvement collar 400 includes a soil improvement CMP 416 that surrounds the outer pier CMP 14, being about 4-5 feet larger in diameter, and is about 5-6 feet deep, to define an annular space 418 that is filled with concrete, preferably 3000 psi concrete. The resulting soil condition improvement collar acts to improve the integrity of the surrounding ground material, i.e., the soil and/or rock substrate, to reduce pier movement and soil cracks at the surface.

Figure 7A:
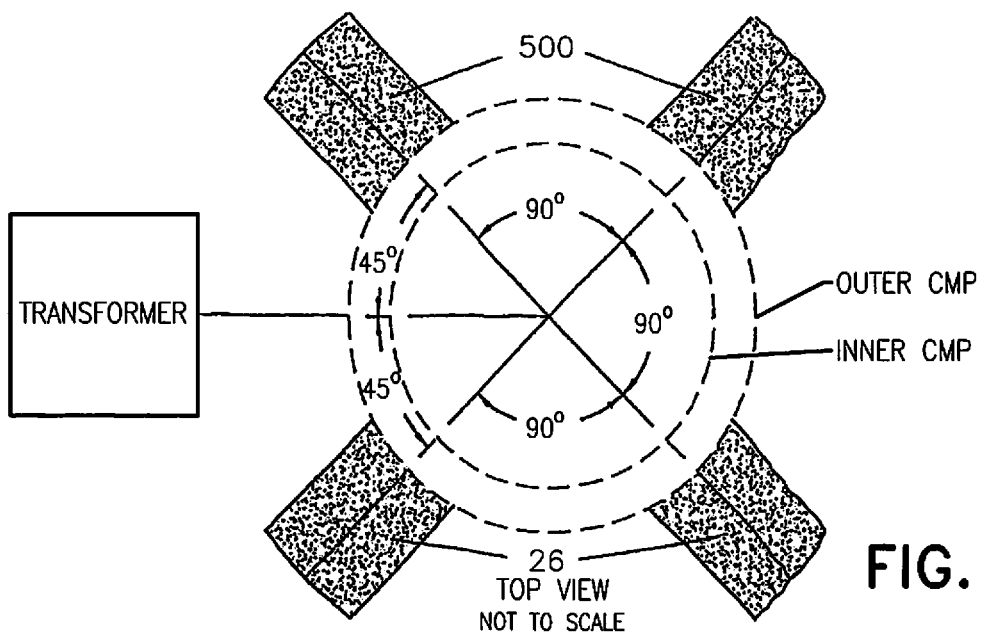
FIG. 7A is a top view of the tensionless concrete pier foundation shown in FIG. 7.
Figure 7:
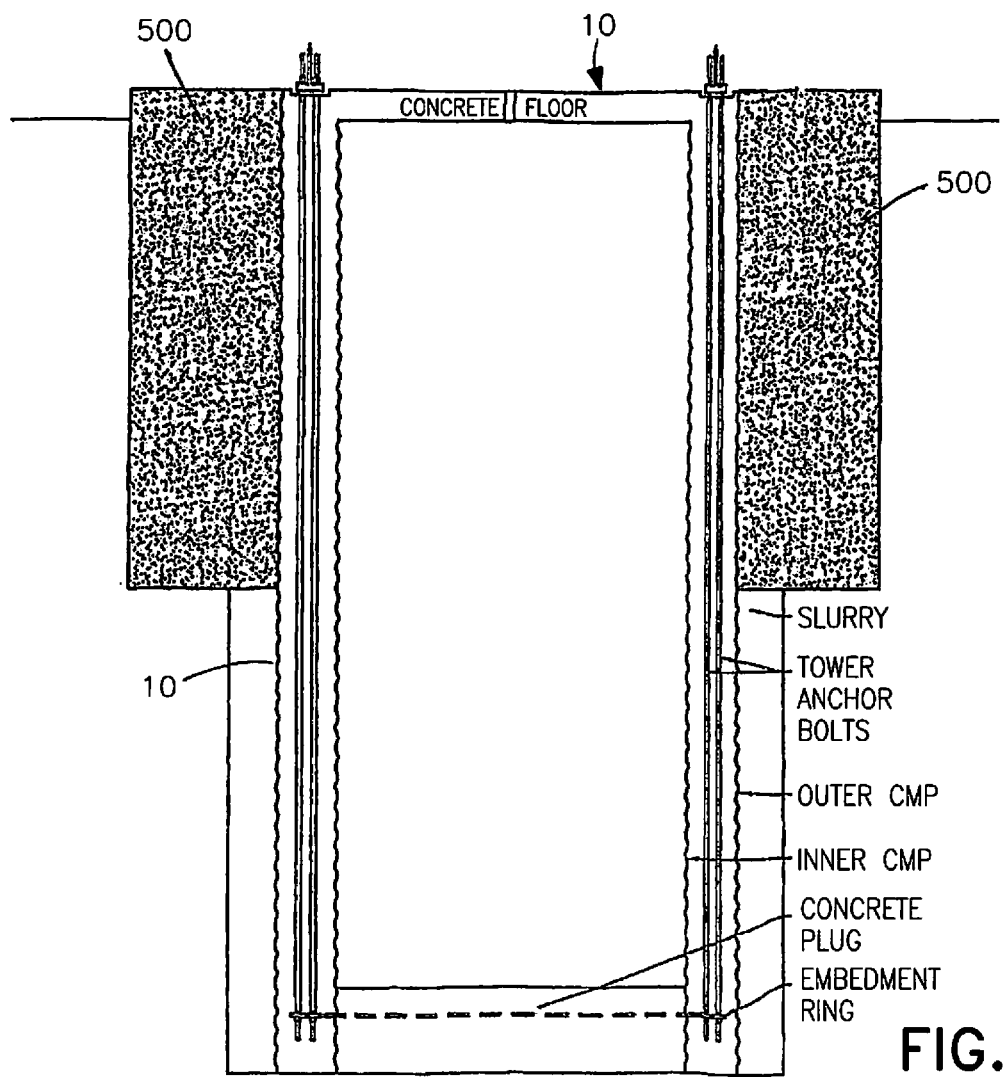
FIG. 7 is a cross-sectional side view of a tensionless concrete pier foundation reinforced with buttress additions in accordance with a fourth embodiment of the present invention.

According to a fourth embodiment of the present invention shown in FIGS. 7 and 7A, the reinforcement structure for the tensionless concrete pier foundation 10 includes buttress additions 500. The buttress additions 500 may be added as part of a new pier construction, to retrofit an existing pier foundation, or to support future repowering of the tower or turbine supported on the foundation.

The buttress additions 300 are preferably formed as individual concrete blocks or reinforcements, either precast or cured in place, each approximately 4 ft wide, 5 ft long and 10 ft deep, that are spaced around the outer perimeter of the pier foundation 10. The buttress additions 500 increase the overall load capacity and stiffness of the pier foundation while also providing deep-level soil improvement. Further, the buttress additions require less concrete than do fully encircling reinforcement collars, and the buttress additions do not interfere with, or require encasement of, the electrical conduits which facilitates ease of construction.

Figure 8:
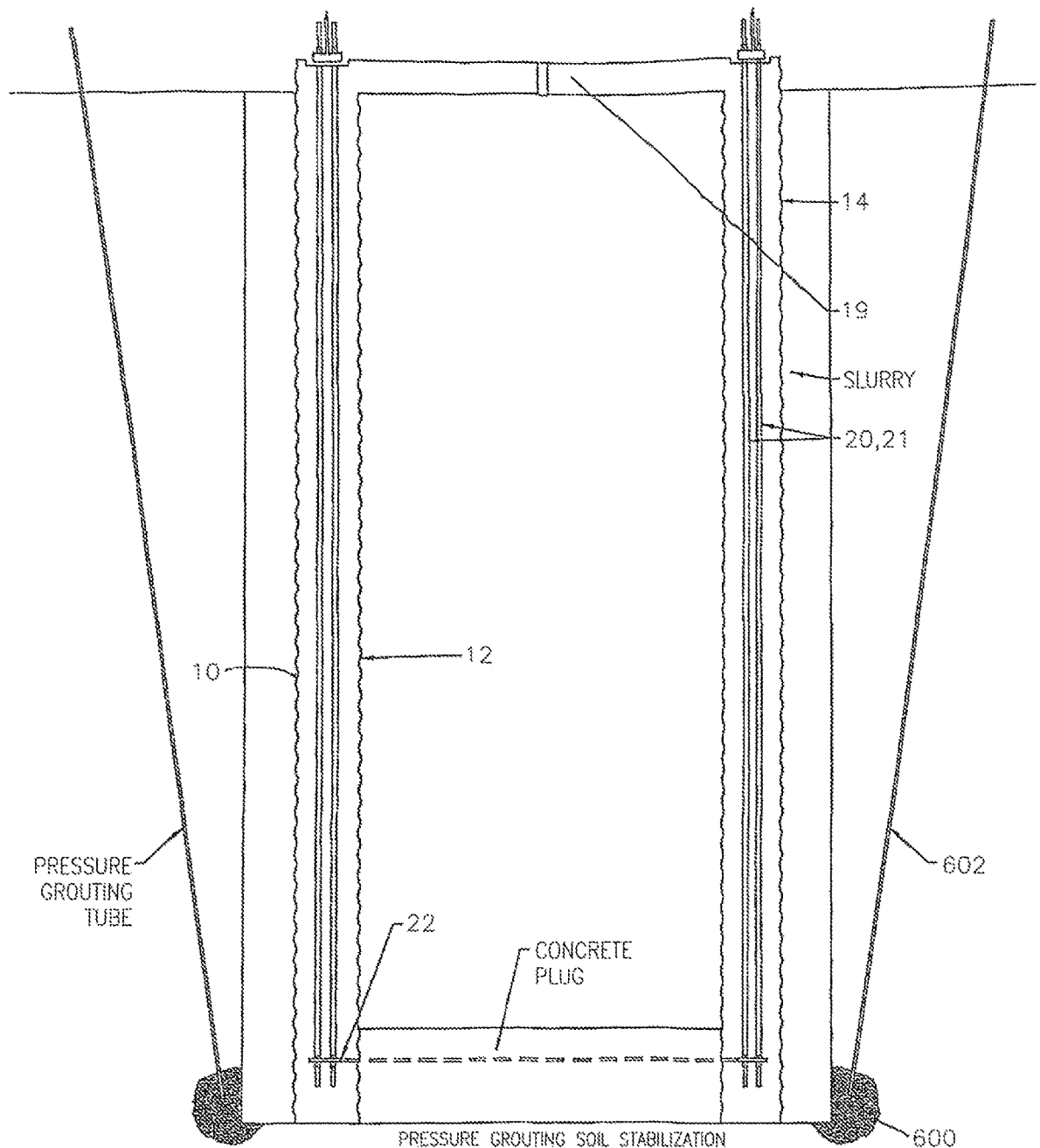
FIG. 8 is a cross-sectional side view of a tensionless concrete pier foundation reinforced with pressure grouted soil stabilization in accordance with a fifth embodiment of the present invention.

According to a fifth embodiment shown in FIG. 8, the present invention includes the stabilizing of a tensionless pier foundation 10 by pressure grouting 600 the surrounding soil to increase the load capacity of the pier foundation by expanding the diameter of the cementitious materials horizontally supporting the pier. According to the method, a grout emitting pipe or tube 602 is driven to the desired soil depth adjacent the base of the foundation 10, followed by pressure grouting to several hundred psi at 5 ft intervals as the grouting pipe is lifted upwardly. Pressure grouting in this way can be performed immediately after construction or years later to improve the pier's resistance to lateral movement. Pressure grouting for soil stabilization also increases the lateral bearing capacity of the surrounding soil and increases the skin friction around the perimeter of the pier foundation.

The present invention is also directed to a method of constructing a post-tensioned reinforcement collar for a tensionless concrete pier foundation having inner and outer pier CMPs as shown in the '417 patent. The outer perimeter of the collar is bounded by a collar CMP and the collar is secured to the inner and outer pier CMPs with a plurality of lateral reinforcing bolts that extend through the three CMPs, spanning the annular spaces between the inner and outer pier CMPs and between the outer pier CMP and the collar CMP. The lateral reinforcing bolts are nutted both outside the collar CMP and inside the inner pier CMP and can include an upper set of lateral reinforcing bolts near the top of the CMPs and a lower set of lateral reinforcing bolts near the bottom of the inner pier and collar CMPs.

According to the method, when constructing a new tensionless pier foundation, the lateral reinforcing bolts of the post-tensioned collar are added before the foundation concrete is poured. The concrete for the tensionless pier can be poured monolithically or a plurality of pours may be placed separately. The bolts are nutted against the inner pier CMP and the collar CMP to retain post-tension loads after both pier and collar concrete cure.

A preferred sequence of the method steps for construction of a new tensionless concrete pier foundation with a reinforcement collar in accordance with the present invention may be summarized as follows:

1. Drill or dig excavation to include center pier area to a first depth and outer collar area to a second depth less than the first depth.
2. Place outer pier CMP 14 into center pier area of excavation.
3. Slurry annular space 117 (see FIG. 3) between excavation perimeter in center pier area and outer pier CMP 14 to bottom of outer collar area.
4. Place inner pier CMP 12 into center pier area of excavation.
5. Pour concrete plug at bottom of inner CMP 12. The depth of the concrete plug can be .increased to provide shear resistance.
6. Backfill lower part of region 17 inside inner pier CMP 12 to about 5 ft from the top of the foundation with uncompacted soil.
7. Place tower anchor bolts 20, 21 secured to the embedment ring 22 placed at the bottom of the pier.
8. Drill soil and/or rock anchor additions vertically into underlying substrate of outer collar area.

9. Place outer collar CMP 112 into outer collar area to create annular space between outer collar CMP 112 and outer pier CMP 14.
10. Bolt bottoms of outer collar CMP and inner and outer pier CMPs with lower lateral reinforcing bolts.
11. Place inner collar CMP on top of lower lateral reinforcing bolts,
12. Bolt tops of outer collar CMP and inner and outer pier CMPs with upper lateral reinforcing bolts.
13. Pour concrete in the annular space between inner and outer pier CMPs.
14. Pour concrete into annular collar space.
15. Pour concrete floor with high strength concrete to depth of about 5 ft.
16. After concrete cure, post-tension lateral steel reinforcing bolts and soil and/or rock anchors, install tower base flange over top of the tower anchor bolts and post tension tower anchor bolts.

While the concrete pours have been identified as separate steps, the concrete may be poured monolithically depending upon the specific construction sequence that is followed in a particular instance. In addition, the annular space between the outer perimeter of the excavation in the outer collar area and the outer collar CMP is also backfilled prior to completion of the foundation.

The post-tensioned collar can also be added to an existing tensionless pier foundation for retrofit or repowering with a larger turbine. The preferred method of adding the post-tensioned collar as a retrofit includes removing the floor as well as the soil within the cylindrical space defined by the inner pier CMP to the depth of the collar, and drilling holes for insertion of the horizontally-extending lateral bolts through the inner pier CMP, the annular concrete ring between the inner and outer pier CMPs, the outer pier CMP, the annular space between the outer pier CMP and the collar CMP, and the collar CMP. The bolts are inserted through the drilled holes and nutted against the inner surface of the inner pier CMP and against the outer surface of the collar CMP during post tensioning. In such a retrofit construction, the deep concrete floor addition can be incorporated within the retrofit collar addition by pouring the deep concrete floor after the concrete in the annular space between the collar CMP and the outer pier CMP has been poured and cured and the bolts post tensioned, effectively replacing the previously existing floor and soil fill which was removed to install the retrofit collar.

As already noted herein, the post-tensioned collar may also include soil and/or rock anchor additions which are placed within drilled holes prior to concrete pour in the collar. According to a preferred method of installation/ rock anchors are installed in drilled holes, such as percussion drilled holes, and are grouted to within a few inches below the bottom of the collar while the upper end of the rock anchor bolt extends to the design height above the collar. Soil anchors can be auger cast or driven piles which are drilled to the design depth with a sleeved centralized bolt. The piles are backfilled with concrete or grout, and terminated a few inches below the bottom of the collar with the sleeved bolt extending above the top of the collar to the design height. Both the rock and the soil anchors are then post-tensioned after concrete pour and cure.

The present invention may also include soil anchor additions formed as helical anchors that are drilled to the design depth with a tube or bolt being central to the helices. An upper end of the tube or bolt extends to the design height above the collar. Helical anchors of this type can be pressure grouted, if required, to increase anchor capacity.

As a further alternative, displacement anchors having a centralized sleeved bolt secured near the top thereof can be drilled and grouted to design depth with the displacement section of the anchor terminating inches below the bottom of the collar and with the upper end of the central sleeved bolts extending to the design height above the collar for post tensioning.

The present invention is also directed to a method of installing repowering additions having tower anchor bolts. The tower anchor bolts extend through the repowering addition collar and are sleeved in like manner as has been described in connection with the rock and/or soil anchor bolts, also being post-tensioned after concrete pour and cure.

The foregoing descriptions and drawings should be considered as illustrative only of the principles of the invention. The invention may be configured in a variety of ways and numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A tensionless concrete pier foundation for supporting a tower, the tensionless concrete pier foundation comprising:
   a concrete pier having a first depth in an excavation, said concrete pier including an outer pier CMP and an inner pier CMP having a smaller diameter than the outer pier CMP to define an annular space between the inner pier CMP and the outer pier CMP;
   a plurality of sleeved tower anchor bolts each having a lower end and an upper end, the plurality of sleeved tower anchor bolts embedded in said annular space and each sleeved tower anchor bolt of said plurality of sleeved tower anchor bolts secured at the respective lower end thereof to an embedment ring adjacent a bottom of the concrete pier, the sleeved tower anchor bolts extending upwardly beyond an upper surface of the concrete pier, said upper surface including a tower base flange support surface configured to support a tower having a tower base flange that is secured against the tower base flange support surface by the sleeved tower anchor bolts which are post-tensioned to keep the concrete pier foundation under compression; and
   a structural post-tensioned collar having a second depth less than the first depth of the concrete pier and an outer perimeter defined by an outer collar CMP that surrounds an upper end but not a lower end of the outer pier CMP to create an annular space that is filled with concrete adjacent the upper surface of the concrete pier, said collar providing increased lateral stiffness, overturning resistance and lateral bearing capacity to the concrete pier.

2. The tensionless concrete pier foundation as set forth in claim 1, wherein the concrete is 6000 psi concrete.

3. The tensionless concrete pier foundation as set forth in claim 1, wherein the structural post-tensioned collar includes (1) an inner collar CMP placed between the outer collarCMP and the outer pier CMP that provides shear resistance and (b) a plurality of sleeved radially-extending horizontal bolts that connect the structural post-tensioned collar to the concrete pier, said sleeved radially-extending horizontal bolts being post tensioned to provide tension steel for minimizing bending of the structural post-tensioned collar and enable said collar to share an overturning (upset) load otherwise borne by the concrete pier alone.

4. The tensionless concrete pier foundation as set forth in claim 3, wherein the structural post-tensioned collar also supports a plurality of soil and rock anchor additions that extend through said collar and into an underlying soil and/or rock substrate to increase capacity and lateral stiffness of the tensionless concrete pier foundation.

5. The tensionless concrete pier foundation as set forth in claim 1, wherein the inner pier CMP is filled with concrete to fill a region extending from a top of the inner pier CMP to a depth of the structural post-tensioned collar to form a deep concrete floor addition that provides structural bending resistance and prevents distortion of the top of the tensionless concrete pier foundation while also providing a floor for the concrete pier.

6. The tensionless concrete pier foundation as set forth in claim 5, wherein the region is about 5 feet deep.

7. The tensionless concrete pier foundation as set forth in claim 1, wherein said tensionless concrete pier foundation is a retrofitted foundation whereby said concrete pier having said inner pier CMP and said outer pier CMP defining said annular space is an existing foundation that is retrofitted with said collar that surrounds the upper end but not the lower end of the outer pier CMP.

8. The tensionless concrete pier foundation as set forth in claim 7, wherein the structural post-tensioned collar includes (a) an inner collar CMP placed between the outer collar CMP and the outer pier CMP that provides shear resistance and (b) a plurality of sleeved radially-extending horizontal bolts that connect the structural post-tensioned collar to the concrete pier, said sleeved radially-extending horizontal bolts being post tensioned to provide tension steel for minimizing bending of the structural post-tensioned collar and enable said structural post-tensioned collar to share an overturning (upset) load otherwise borne by the concrete pier alone.

9. The tensionless concrete pier foundation as set forth in claim 8, wherein the structural post-tensioned collar also supports a plurality of soil and rock anchor additions that extend through the annular space of said structural post-tensioned collar and into an underlying soil and/or rock substrate to increase capacity and lateral stiffness of the tensionless concrete pier foundation.

10. The tensionless concrete pier foundation as set forth in claim 7, wherein the annular space of the structural post-tensioned collar has a depth of about 5 feet.

11. The tensionless concrete pier foundation as set forth in claim 1, wherein the annular space of the structural post-tensioned collar has a depth of about 5 feet.

12. A method of retrofitting an existing tensionless pier foundation with a post-tensioned reinforcement collar having horizontally extending lateral bolts and a collar CMP, the existing tensionless pier foundation having a depth and inner and outer pier CMPs separated by an annular space filled with concrete to form a concrete ring, the inner pier CMP defining a cylindrical space filled with soil or other material and covered by a floor, the method comprising:
  removing the floor as well as the soil or other material within the cylindrical space defined by the inner pier CMP to a depth of the reinforcement collar less than the depth of the existing tensionless pier foundation;
  drilling holes for insertion of the horizontally-extending lateral bolts through the inner pier CMP, the annular concrete ring between the inner and outer pier CMPs, and the outer pier CMP;
  inserting the horizontally-extending lateral bolts through the drilled holes and through an annular space between the outer pier CMP and the collar CMP, and through openings in the collar CMP, wherein the collar CMP surrounds an upper end but not a lower end of the outer pier CMP;
  pouring concrete into the annular space between the outer pier CMP and the collar CMP; and
  nutting the bolts against an inner surface of the inner pier CMP and against an outer surface of the collar CMP and post tensioning the lateral bolts after concrete cure.

13. The method as set forth in claim 12, further comprising the step of pouring a deep concrete floor addition into the cylindrical space, the deep concrete floor being 5 ft deep to provide structural bending resistance and replacing the previously existing floor and soil or other material which was removed to install the reinforcement collar.

\* \* \* \* \*